UNITED STATES PATENT OFFICE.

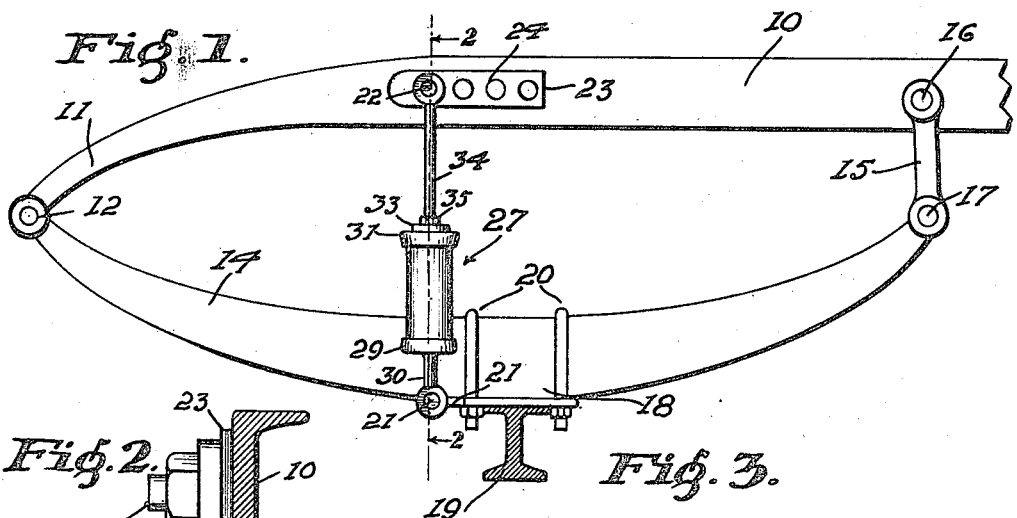

HERBERT H. HUNTER, OF LONG BEACH, CALIFORNIA.

SHOCK-ABSORBER.

1,242,103.  Specification of Letters Patent.  Patented Oct. 2, 1917.

Application filed October 12, 1916. Serial No. 125,305.

*To all whom it may concern:*

Be it known that I, HERBERT H. HUNTER, a citizen of the United States, residing at Long Beach, in the county of Los Angeles and State of California, have invented new and useful Improvements in Shock-Absorbers, of which the following is a specification.

This invention relates to a shock absorber and particularly pertains to a device adapted to act in conjunction with the springs of a vehicle to absorb violent and excessive shocks and rebounds.

It is an object of this invention to provide a shock absorber which will act to cushion the movement of a vehicle chassis in relation to its running gear and thereby obviate the violent depression and rebound of the vehicle chassis when the running gear encounters irregularities in the road bed.

Another object is to provide a shock absorber of the above class which will act automatically to increase the cushion created within the absorber as the depression or rebound increases, thereby insuring that the shock will be gradually absorbed without causing a sudden check in the movement of the chassis.

Another object is to provide a shock absorber which may be readily and simply applied to vehicles of common construction without necessitating alteration of existing parts and requiring the substitution of but a single member for that commonly used in spring mountings.

Another object is to provide a shock absorber which will act in a simple and positive manner to increase or decrease the fluid pressure within the compression chamber in a direct ratio to the relative movement of the absorber plunger in relation to said chamber and consequently in direct ratio to the movement of the vehicle frame in relation to the running gear.

It is a further object to provide a shock absorber of the type for use upon vehicles, which will be compact and strong in its construction, and possesses few movable parts, none of which are liable to become broken or inoperative.

Other objects will appear hereinafter.

The invention is illustrated, by way of example, in the accompanying drawings in which:

Figure 1 is a view in side elevation illustrating the end of a vehicle frame provided with a suspension spring by which it is supported upon a vehicle axle and further illustrating the manner in which a shock absorber is operatively mounted thereupon.

Fig. 2 is a view in vertical section as seen on the line 2—2 of Fig. 1 and as clearly illustrating the correlative mounting of the shock absorber in relation to the vehicle frame and vehicle spring, and further illustrates the detail construction of the compression cylinder.

Fig. 3 is a view in transverse section and elevation as seen on the line 3—3 of Fig. 2 and as illustrating the formation of the movable valve disk.

Fig. 4 is a view in transverse section as seen on the line 4—4 of Fig. 2 and particularly illustrates the formation of the fixed valve disk.

Referring to the drawings more particularly, 10 indicates the frame of an automobile and it is here shown as formed with a downwardly extending horn portion 11 through which a spring bolt 12 extends to secure the end of a semi-elliptical spring 14 in pivotal relation to the frame. While I have here shown the vehicle spring as being semi-elliptical, it will be readily understood that springs of various types may be used. The spring 14 is secured to the frame at its rear end by means of a shackle 15 which is pivotally mounted to the frame by a shackle-bolt 16 and to the spring by a bolt 17. Rigidly secured beneath the spring and at a point adjacent its center, is a spring pad 18 which is mounted upon the axle 19 and is provided with a pair of U-bolts 20 to encircle the spring and hold it in position.

The spring pad 18 is provided with a horizontally extending stud 21 which is in vertical alinement with a stud 22 fixed to the frame of the vehicle by a bolting plate 23 held by bolts or rivets 24. These studs are threaded at their outer ends to receive nuts 25 and 26 which hold a shock absorber 27 in position. This absorber is composed of a cylindrical compression chamber 28 which is vertically disposed and which is secured at its lower end with an end casting 29 by the engagement of suitable threads formed upon the adjacent members. The casting 29 is formed with a downwardly extending lug 30 which is adapted to register with the stud 21 and be secured thereupon in a pivotal manner by the nut 26. The upper end of the cylinder is inclosed by a threaded cap 31 formed with a central threaded bore 32. This bore is adapted to receive a packing bushing 33 within which a stuffing gland is formed. The stuffing gland is provided to allow vertical reciprocation of a plunger rod 34 therethrough and to prevent the leakage of liquid from the cylinder. A packing nut 35 is threaded into the gland to form a more satisfactory joint. The cap 31 is further provided with a screw-plug 36 which may be removed to allow an oil or other liquid to be placed within the cylinder 28.

The plunger 34 is formed with an eye which registers with the stud 22 and is held in position by nut 25. When so positioned the plunger 34 and the lug 30 are in vertical alinement and lie along a common axis. The lower end of the plunger 34 is formed with a squared portion 37 and terminates with a reduced cylindrical portion 38 which is threaded at its end to receive a nut 39. Mounted upon the squared portion 37 is a fixed valve disk 40 which is of a diameter approximately equal to the bore of the cylinder 28, and is further formed with a series of arcuate ports 41 which extend through the body of the disk. Mounted upon the cylindrical portion 38 of the plunger is a rotatable disk 42 which is formed with ports 43 of a size and shape equal to ports 41 and adapted to substantially register with ports 41 when the plunger is in the position indicated in Fig. 2 of the drawings.

It will be understood that the compression cylinder 28 is intended to be filled with a lubricating oil or other non-corrodible fluid and that the valve disks 40 and 42 are adapted to be moved through this fluid upon the deflection and rebound of the vehicle spring 14 in relation to the frame. In order to gradually absorb the shock incident to the deflection and rebound of the spring without producing a dead disagreeable stop to the movement of the vehicle in relation to the running gear, means are provided for gradually increasing the compression of the fluid within the compression chamber as the spring and vehicle move from their normal relative position. This is accomplished by means of a longitudinal cam tongue 44 which extends inwardly from the wall of the compression cylinder 28 and engages a groove 45 formed through the peripheral edge of the disk 42. The configuration of the tongue 44 is such as to permit ports 41 and 43 to register when the spring stands in its normal position and to rotate the disk 42 in relation to the disk 40 as the plunger rod moves upwardly or downwardly within the compression chamber. It will be seen that, due to the fact that the disk 40 is provided with a clearance slot 46 and is held against rotation upon the squared end of the plunger rod 34, movement of the disk 42 will cause the ports 41 and 43 to move out of register and restrict the flow of fluid from one side of the disks to the other.

In operation, the cylinders are applied to the various supporting springs as indicated in Fig. 1 of the drawings, although other methods of mounting may be found to be more convenient for various types of automobiles. When in position the axle of the automobile is free to move up and down as impelled by the irregularities of the highway over which it is passing. As the axle moves up and down, the compression cylinder 28 and the plunger 34 will be telescoped one within the other and will consequently cause the valve disks 40 and 42 to move up and down within the compression cylinder. This movement will produce a rotation of the valve disk 42 as it follows the sinuous path of travel controlled by the longitudinally extending tongue 44 and will cause the port openings to be closed as the disks reach either the top or bottom end of the cylinder. Reference being had to Fig. 2 of the drawings, it will be seen that the ports will gradually move to a closed position and thus constantly and gradually increase the compression within the cylinder, thus absorbing the shock of impact or rebound without objectionable jar to the occupants of the vehicle.

It will thus be seen that the shock absorber here provided will act in a simple way without the use of complicated mechanisms to absorb violent shocks imparted to the running gear of a vehicle and to gradually oppose them by a cushion which will deaden the shock without producing a violent reaction. It will further be observed that the mechanism here provided is not liable to become inoperative or greatly worn during operation.

I claim:

In a shock absorber, a compression cylinder, a plunger reciprocally mounted in the compression cylinder, a valve disk fixed to the end of the plunger and adapted to reciprocate in the compression cylinder and having a clearance notch in its periphery, said valve disk having three segmental concentric ports aggregating more than half a circle, a second valve disk fitting the compression cylinder and rotatably secured to the plunger against the first valve disk and having mating ports and having an operating notch in its periphery, and a tongue extending from the inner face of the compression cylinder windingly from end to end, said tongue fitting in said notches; so that as the valve disks are reciprocated the second valve disk is rotated to move the ports into and out of registration.

In testimony whereof I have signed my name to this specification.

HERBERT H. HUNTER.